Patented June 10, 1952

2,599,620

UNITED STATES PATENT OFFICE 2,599,620

CARBOXYMETHYL ETHERS

William Frederick Filbert, Woodbury, N. J., assignor to E. I. du Pont de Nemours & Company, Wilmington, Del., a corporation of Delaware No Drawing. Application August 31, 1950,
Serial No. 182,641

10 Claims. (Cl. 260—209)

The present invention relates to the production of ethers of starches and polyuronides. More particularly, this invention relates to the production of water-soluble carboxymethyl ethers of starches, gums and hemicelluloses.

Water soluble alkali metal salts of carboxymethyl ethers of starches, gums and hemicelluloses have been prepared by the reaction of an alkali and an etherifying agent with the starch, gum, or hemicellulose. In general, the prior art procedure has been to mix the selected material with alkali and the etherifying agent in the presence of water, although in German Patent 717,275, it was proposed to also add a water miscible organic agent to the reaction mixture.

The major difficulty with the prior art process has been due to the tendency of starches, gums and hemicelluloses to form semi-solid gels when treated with alkali. The gel formation prevents a uniform reaction of the alkali starch, gum or hemicellulose with the etherifying agent, unless the alkali-treated material is very dilute or is first subjected to a thorough grinding operation, and even then a prolonged period is required for satisfactory etherification. The product finally obtained by this procedure is a coarse solid difficult to purify unless milled or dissolved in water and reprecipitated with the aid of a miscible organic agent such as methanol. Even after purification, the products resulting from this process are rarely uniform from batch to batch, particularly with respect to viscosity characteristics in water solutions.

The addition of a water miscible organic agent as proposed by the German Patent No. 717,275, previously mentioned, is for the purpose of reducing the formation of the alkali gel. The patentee, in describing his process, stated that a desirable product was obtained after permitting his reaction mixture to stand one day at room temperatures. Experiments conducted in accordance with this disclosure revealed that elevating the temperature of the reaction mixture to reduce the prolonged reaction period resulted in the formation of a lumpy product difficult to purify. Even after a prolonged reaction time at low temperatures, the product, while water-soluble, produced only low-viscosity solutions.

Water soluble ethers of starches, gums and hemicelluloses, if economically produced, have commercial utility in many fields, such as textile and paper manufacture. For many uses, a high viscosity characteristic is greatly desired.

An object of the present invention is to provide a method of producing water-soluble carboxymethyl ethers of starches, gums and hemicelluloses having commercially suitable characteristics. A further object of the present invention is to provide a process for preparing water-soluble carboxymethyl ethers of starches, gums and hemicelluloses in a selected range of viscosity characteristics, and having a relatively high degree of purity. A still further object is to provide such a process wherein the ethers can be produced economically in quantity and in a suitable physical form. Additional objects will become apparent as the present invention is further described.

I have found that the foregoing objects may be attained by reacting with efficient agitation, at an elevated temperature, a finely divided starch, gum or hemicellulose with alkali and an etherifying agent in a water-alcohol mixture wherein the alcohol ratio falls in a carefully selected range.

As the etherifying agent, I prefer to use monochloroacetic acid or the alkali salt thereof. The finely divided starch, gum or hemicellulose containing the moisture usually present in the commercial product may be used directly, or if preferred, the thoroughly dried material may be used. The alkali is introduced in the form of an aqueous solution, and water may be introduced with the etherifying agent. All of the water present in the reaction zone must be considered in selecting the quantity of alcohol required to obtain the desired result, and also the type of alcohol used. I have found that good results can be obtained by using an alcohol of the lower aliphatic group, such as methanol, ethanol, propanol and isopropanol.

In carrying out the reaction it is preferred to operate at a temperature near the boiling point of the alcohol, although highly satisfactory results can be obtained by a more prolonged operating period at temperatures as low as 50° C. Generally, the temperatures of the reaction will lie in the range of from 50° C. to 85° C. It is convenient to operate at a reflux temperature.

The following examples will serve to illustrate the invention, the parts being by weight.

EXAMPLE 1

133 parts of methanol (100%) and 17.5 parts of chloroacetic acid were thoroughly mixed, and heated to 50° C. 204 parts of finely divided potato starch (moisture 2%) were added with continuous mixing, followed by 30.5 parts of flake 97% sodium hydroxide dissolved in 68 parts of water. The reaction mixture was held at 50° C.

for 1 hour with the maintenance of good agitation, and then neutralized with acetic acid. After removal of the mother liquor, the product was washed several times with 80% methanol and finally with 100% methanol. After drying, the product was a white powder, containing 0.2% chloride, giving a clear smooth solution in water, a 1% solution having a viscosity of 128 centipoises. The reaction efficiency was 53% based on a theoretical degree of etherification of 0.15 and an actual degree of etherification of 0.08. The methanol/water ratio was 1.75.

EXAMPLE 2

Following the procedure set forth in Example 1, except that the methanol-chloroacetic acid mixture was heated to 60° C. prior to the addition of the potato starch, and that the reaction mixture was refluxed at about 70° C., the following results were obtained by varying the reaction time and ingredient ratios.

Table 1

| | Parts 100% Methanol | Parts Chloroacetic Acid | Parts 50% Aqueous NaOH | Parts Potato Starch | Reaction Time Minutes | Methanol/Water Ratio | T. D. E.[1] | D. E.[2] | Per Cent R. E.[3] | Viscosity (Centipoises) 1% Sol. | Per Cent Chloride |
|---|---|---|---|---|---|---|---|---|---|---|---|
| A | 204 | 40 | 79.5 | 138 (2.5% H₂O) | 60 | 4.0 | 0.50 | 0.22 | 44 | 7000 | 0.10 |
| B | 204 | 27.6 | 55 | 109 (15% H₂O) | 60 | 4.1 | 0.50 | 0.23 | 46 | 6350 | 0.25 |
| C | 204 | 19 | 97 | 165 (2.1% H₂O) | 45 | 3.7 | 0.20 | 0.13 | 65 | 78 | 0.06 |
| D | 597 | 47 | 238 | 453 (15.5% H₂O) | 15 | 3.0 | 0.20 | 0.16 | 80 | 215 | 0.46 |

[1] Theoretical Degree of Etherification.
[2] Obtained Degree of Etherification.
[3] Reaction Efficiency.

In each case, the product was a white powder soluble in water.

EXAMPLE 3

286 parts of ethanol (92.4% by weight), 29.2 parts of chloroacetic acid, and 102 parts of potato starch (2% moisture) were slurried, and 38.4 parts of flake 97% sodium hydroxide dissolved in 69.0 parts of water were added with the maintenance of the slurry temperature below 50° C. Agitation at 50° C. was continued for 2 hours. The reaction mixture was neutralized with acetic acid, the mother liquor removed, and the product washed with 80% methanol. After drying, the white powder containing 0.37% chloride was found to be soluble in water, a 1% solution having a viscosity of 1580 centipoises. The reaction efficiency was 68% based on a theoretical degree of etherification of 0.50 and an actual degree of etherification of 0.34. The ethanol/water ratio was 2.7.

EXAMPLE 4

737 parts of ethanol (92.4% by weight) and 59 parts of monochloroacetic acid were mixed, and heated to 55° C. 204 parts of potato starch (2% moisture) were mixed in, and 119 parts of 50% aqueous sodium hydroxide added. After reacting for 15 minutes at about 81° C. under reflux conditions with constant agitation, the slurry was cooled to about 40° C., and the excess caustic neutralized with glacial acetic acid. After removal of the liquid portion, the product was washed with 80% ethanol and filtered. The dried product was a white finely divided powder containing 1.33% chloride, water soluble, and having a viscosity in a 1% water solution of 83 centipoises. The reaction efficiency was 62% based on a theoretical degree of etherification of 0.50 and an obtained degree of etherification of 0.31. The ethanol/water ratio was 4.7.

EXAMPLE 5

102 parts of potato starch (2% moisture), 29.2 parts chloroacetic acid and 437 parts n-propanol were slurried, and 30.5 parts of flake 97% sodium hydroxide dissolved in 116 parts of water slowly added with constant agitation, the temperature being maintained below 50° C. The slurry was then agitated for one hour at 50° C. After neutralization with acetic acid, and separation of the liquid portion, the product was washed with 80% methanol, and dried. The product was a coarse powder containing 0.23% chloride and gave a bright, somewhat grainy solution in water, a 1% solution having a viscosity of 458 centipoises. The reaction efficiency was 50% based on a theoretical degree of etherification of 0.50 and an obtained degree of etherification of 0.25. The n-propanol/water ratio was 3.5.

EXAMPLE 6

Using the same procedure and ingredients as in Example 5, with the substitution of isopropanol for n-propanol, a similar product containing 0.41% chloride was obtained, the viscosity of a 1% solution being 1312 centipoises. The reaction efficiency was 50%, the degree of etherification being 0.25.

EXAMPLE 7

875 parts of isopropanol and 59 parts of monochloroacetic acid were mixed and heated to 55° C. 231 parts of finely divided potato starch (15.5% moisture) were added with agitation, followed by 119 parts of a 50% aqueous solution of sodium hydroxide. After refluxing at about 81° C. for 30 minutes with constant agitation, the slurry was cooled to about 40° C., and neutralized with glacial acetic acid. After filtering, the product was washed with aqueous methanol and dried.

A white, finely divided powder containing 1.90% chloride soluble in water was obtained. A 1% solution had a viscosity of 11.4 centipoises. The reaction efficiency was 94% based on a theoretical degree of etherification of 0.50 and an obtained degree of etherification of 0.47. The isopropanol/water ratio was 8.2.

EXAMPLE 8

Using 109 parts of methanol (100%) 23.5 parts of monochloroacetic acid, 44 parts of a 50% aqueous solution of sodium hydroxide and 40 parts of a dried powdered gum, and following the procedure of Example 1, except that a temperature of about 55° C. was maintained for 45 minutes, the following results were obtained. The methanol/water ratio was 4.1, and the formulation based on a theoretical degree of etherification of 1.0. The products were powders readily soluble in water.

| Gum | Color | Viscosity 1% water solution | D. E.[1] | R. E.[2] Per cent | Per cent Chloride |
|---|---|---|---|---|---|
| Tragacanth | Yellow | 4.8 | 0.81 | 81 | 0.27 |
| Locust Bean | do | 717.0 | 0.51 | 51 | 1.68 |
| Karaya | Brown | 11.2 | 0.75 | 75 | 0.33 |
| Arabic | White | 2.2 | 0.50 | 50 | 1.75 |
| Guar | do | 144.0 | 0.48 | 48 | 1.55 |

[1] Degree of etherification.
[2] Reaction efficiency.

EXAMPLE 9

250 parts of methanol (100%) and 16.3 parts of monochloroacetic acid were mixed and then 22 parts of powdered hemicellulose prepared from aspen wood (molecular weight about 8000) and consisting mainly of xylan (83%) and uronic acid anhydride (14%), were mixed in. After adding 29.5 parts of a 50% aqueous sodium hydroxide solution over a period of 15 minutes at 20° C., the temperature was raised to 60° C. and maintained there for 1 hour. After cooling and neutralization with acetic acid, the slurry was filtered and the solid product washed with aqueous methanol. After drying, the light cream-colored powder, containing 0.58% chloride was found to be water-soluble, a 5% solution having a viscosity of 19 centipoises. The methanol/water ratio was 13.4.

EXAMPLE 10

Using the same ingredients and procedure as Example 9, substituting ethanol (92.4% by weight) for methanol, the ethanol/water ratio being 6.1, a similar product containing 0.86% chloride is obtained having a viscosity of 11 centipoises in 5% solution.

EXAMPLE 11

This example indicates the results of runs outside the ranges of the present case.

48.7 parts of starch, 17.5 parts of sodium chloroacetate, 7.0 parts of sodium hydroxide, 47.5 parts of methanol, and the parts of water shown in the following table were slurried together at room temperature. The parts of water shown were derived from the starch, the sodium chloroacetate and the water used to dissolve the sodium hydroxide. The following results were obtained.

bohydrate molecule. The reaction efficiency in per cent is defined as the ratio of the degree of etherification actually obtained to the theoretical degree of etherification, multiplied by 100. The alcohol/water ratio is defined as parts by weight of alcohol per unit part of water in the reaction mixture, as described below.

Example 2 illustrates the preparation of several grades of sodium carboxymethyl ethers of starch by the preferred process. It has been found that mixing the methanol, monochloroacetic acid and starch together before adding the caustic solution helps in the production of the product in a finely divided form.

Examples 1, 3, 5 and 6 illustrate the preparation of a water-soluble sodium carboxymethyl ether of starch when operating the present process at the minimum temperature and with the minimum alcohol/water ratio. Examples 2, 4 and 7 illustrate the advantage of operating at higher temperatures and alcohol/water ratios.

Examples 8, 9 and 10 illustrate the applicability of the present process to gums and hemicelluloses as well as to starches. The chloride content given in the examples is an indication of the purity of the products made by this process. Crude products may contain 3 to 10% or more of chloride. Example 11 illustrates the critical nature of the temperature range and the minimum alcohol/water ratio. It will be noted that prolonged reaction time is essential at low temperatures to obtain a finely-divided water soluble product, and that with too low an alcohol/water ratio, only four minutes heating caused the formation of a lumpy product which could not be conveniently purified by slurring with aqueous alcohol. The products obtained which were water soluble were all of extremely low viscosity.

In view of the fact as the molecular weight of the alcohol increased, the alcohol/water ratio for the process also had to be increased, a number of runs were carried out to determine the minimum alcohol-to-water ratios which would be mechanically operable, would give products of good solubility, and could be mathematically related to the alcohols used. These ratios were determined for methanol, ethanol, n-propanol and isopropanol. In calculating the alcohol-to-water ratios, the water included was from the starch, flake caustic, water in the alcohol, if any, water formed in neutralizing the monochloroacetic acid, and the water added in the caustic solution. Water formed during the etherification, being of very small proportion, was neglected. As previously indicated, the lowest satisfactory ratios are shown in Examples 1, 3, 5 and 6. From these examples, an empirical relation-

| | Water (Parts) | Methanol/Water Ratio | Reaction Time | Etherification Temp. | Product | Water Soluble | Viscosity 1% Solution |
|---|---|---|---|---|---|---|---|
| A | 40.1 | 1.2 | 1 day | Room | Powder | Yes | |
| B | 35.4 | 1.3 | 19 hours | do | do | Yes | 3 |
| C | 43.8 | 1.1 | 8 hours | do | Caked Powder | Yes | 12 |
| D | 43.8 | 1.1 | 1 hour | do | Powder | No | |
| E | 43.8 | 1.1 | 4 minutes | 25 to 63° C | Lumps | No | |

Throughout this description, the following definitions are applicable. The theoretical degree of etherification (T. D. E.) is defined as the number of mols of the etherifying agent per anhydro glucose unit. The degree of etherification obtained (D. E.) is defined as the average number of carboxymethyl units which have been introduced per anhydro glucose unit of the carbohydrate molecule.

ship was developed between the minimum alcohol/water ratios and the number of carbon atoms in the alcohols used. This relationship is as follows: alcohol/water ratio $= 1.75 \ (1 + \frac{1}{2} \ (N-1))$ where $N =$ the number of carbon atoms in the alcohol in question.

The present process of etherification may be applied to starches other than potato, such as rice, wheat, waxy maize and to starch fractions such as amylose and amylopectin, and to modified starches provided they are in a finely divided condition. Gums and hemicelluloses can also be etherified in accordance with the present invention. With respect to hemicelluloses, it will be observed that the efficiency of the reaction is greatly increased if ethanol instead of methanol is used as the water-miscible organic agent during the etherification.

It will be understood that the examples given in the foregoing are set forth as specific embodiments of the invention and are not to be construed as limiting it.

I intend, therefore, to be bound only by the following claims:

1. A process for preparing finely-divided water-soluble alkali metal salts of carboxymethyl ethers of starches and polyuronides which comprises treating a finely divided material selected from the group consisting of starches, gums and hemicelluloses, in an alcoholic solution of an etherifying agent selected from the group consisting of monochloroacetic acid and alkali metal monochloroacetate in the presence of water and alkali at a temperature of 50° C. or above, the alcohol/water weight ratio being at least 1.75 $(1+\frac{1}{2}(N-1))$ wherein N is the number of carbon atoms in the alcohol in question.

2. A process for the preparation of finely-divided, purified water-soluble alkali metal salts of carboxymethyl ethers of starches and polyuronides which comprises dispersing a finely-divided material selected from the group consisting of starches, gums and hemicelluloses, in an alcoholic solution of an etherifying agent selected from the group consisting of monochloroacetic acid and alkali monochloroacetate, the alcohol/water weight ratio being at least 1.75 $(1+\frac{1}{2}(N-1))$ wherein N is the number of carbon atoms in the alcohol in question, adding an aqueous solution of alkali to said dispersion, maintaining the mixture thus formed at a temperature in the range of from about 50° C. to the boiling point of the alcohol for a period of time, cooling the said mixture and adding thereto sufficient organic acid to neutralize excess alkali, separating the liquid and solid portions of the said mixture, washing the solid portion with aqueous alcohol, and thereafter drying the washed portion.

3. A process for the preparation of finely-divided, purified water-soluble alkali metal salts of carboxymethyl ethers of starches and polyuronides which comprises dispersing a finely-divided material selected from the group consisting of starches, gums and hemicelluloses, in an alcoholic solution of an etherifying agent selected from the group consisting of monochloroacetic acid and alkali monochloroacetate, adding an aqueous solution of alkali to said dispersion, maintaining the mixture thus formed at a temperature in the range of from about 50° C. to the boiling point of the alcohol for a period of time, cooling the said mixture and adding thereto sufficient organic acid to neutralize excess alkali, separating the liquid and solid portions of the said mixture, washing the solid portion with aqueous alcohol, and thereafter drying the washed portion, said alcohol/water weight ratio of the reaction mixture being at least 1.75 $(1+\frac{1}{2}(N-1))$, wherein N is the number of carbon atoms in the alcohol.

4. A process as claimed in claim 3, wherein the mixture is maintained at reflux temperature for a period of at least fifteen minutes.

5. A process as claimed in claim 3 wherein the alcoholic solution of the etherifying agent is a methanol solution.

6. A process as claimed in claim 3, wherein the alcoholic solution of the etherifying agent is an ethanol solution.

7. A process as claimed in claim 3, wherein the alcoholic solution of the etherifying agent is a propanol solution.

8. A process for the preparation of finely-divided, purified water-soluble alkali metal salts of carboxymethyl ethers of starches, which comprises mixing a finely divided starch with monochloroacetic acid and alkali in the presence of alcohol and water, the alcohol/water weight ratio being at least 1.75 $(1+\frac{1}{2}(N-1))$, wherein the N is the number of carbon atoms in the alcohol, heating the mixture thus formed to a temperature in the range from about 50° C. to the reflux temperature of the said mixture, maintaining the mixture at said elevated temperature during etherification, and thereafter purifying the etherified starch.

9. A process for the preparation of finely-divided, purified water-soluble alkali metal salts of carboxymethyl ethers of gums, which comprises mixing a finely divided gum and monochloroacetic acid and alkali in the presence of alcohol and water, the alcohol/water weight ratio being at least 1.75 $(1+\frac{1}{2}(N-1))$, wherein N is the number of carbon atoms in the alcohol, heating the mixture thus formed to a temperature in the range from about 50° C. to the reflux temperature of the said mixture, maintaining the mixture at said elevated temperature during etherification, and thereafter purifying the etherified gum.

10. A process for the preparation of finely-divided, purified water-soluble alkali metal salts of carboxymethyl ethers of hemicelluloses, which comprises mixing a finely divided hemicellulose with monochloroacetic acid and alkali in the presence of alcohol and water, the alcohol/water weight ratio being at least 1.75 $(1+\frac{1}{2}(N-1))$, wherein N is the number of carbon atoms in the alcohol, heating the mixture thus formed to a temperature in the range from about 50° C. to the reflux temperature of the said mixture, maintaining the mixture at said elevated temperature during etherification, and thereafter purifying the etherified hemicellulose.

WILLIAM FREDERICK FILBERT.

REFERENCES CITED

The following references are of record in the file of this patent:

UNITED STATES PATENTS

| Number | Name | Date |
| --- | --- | --- |
| 1,682,292 | Lilienfeld | Aug. 28, 1928 |
| 1,682,294 | Lilienfeld | Aug. 28, 1928 |
| 1,884,629 | Dreyfus | Oct. 25, 1932 |
| 2,520,161 | Moe | Aug. 29, 1950 |